June 6, 1944.                W. BARSTIES                    2,350,712
                             FLUID LEVEL GAUGE
                           Filed March 25, 1941
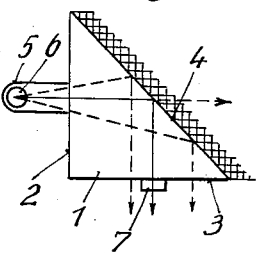
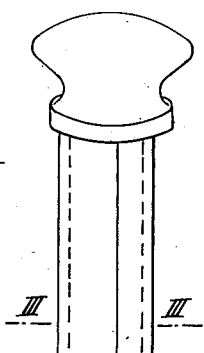
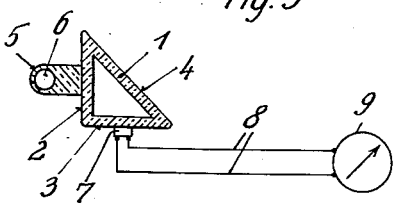
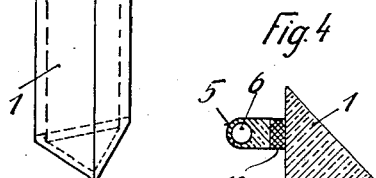
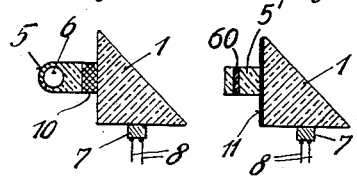
Inventor:
Wilhelm Barsties
By: Stevens and Davis
         Attys.

Patented June 6, 1944

2,350,712

UNITED STATES PATENT OFFICE 2,350,712

FLUID LEVEL GAUGE

Wilhelm Barstles, Berlin, Germany; vested in the Alien Property Custodian

Application March 25, 1941, Serial No. 385,174
In Germany March 1, 1940

4 Claims. (Cl. 73—293)

The present invention relates to devices by means of which the level at the boundary between two adjacent media is measured. The media preferably are liquids and gases. The invention serves the purpose of measuring the level in tanks, chiefly of indicating and thereby measuring the level of liquid in a tank.

This problem is solved by the invention without the use of parts moved or adapted to be changed by the media, but by predominantly by inertialess means, as light and electric forces. Supposition for the use of the invention is only that the two contiguous phases, liquid and gas or two liquids which do not mix, refract a light beam differently from each other and also differently from the transparent substance within which according to the invention the light is to be refracted in a definite manner.

The invention is based on the known fact that light directed from the surface of a base or perpendicular of a triangular prism into the prism may be totally reflected by the hypotenuse surface and therefore is emitted symmetrically or like the image reflected by a mirror at the other surface of the perpendicular or base of the prism.

Devices are known already which, by means of a photo-electric cell, allow the subjective observation of an illuminated level of liquid or its indication. These devices, however, are concerned with means rendering measuring marks, badly recognizable due to workable conditions, better visible by suitable illumination, under circumstances also by way of photo-electric elements, whereby for instance also switching operations are controlled by means of limit contacts. A continuous measuring and remote registering is impossible with these arrangements. Measuring methods operating with photo-electric elements also are known. According to these methods the source of light is so controlled by the increase or decrease of the liquid column that the photo-electric cell is impinged with changeable light intensity. The intensity control is not constant as too many variable functions adulterate the result of the measuring.

The means according to the present invention operates with a constant surface loading of the photo-electric cell and, therefore, the transparent body, having a constant refractory value, is inserted for effecting control.

To more clearly explain the device according to the invention with regard to known apparatus, the following geometrical consideration may serve:

With the known apparatus a meniscus, i. e., a more or less curved surface, is scanned. With the device according to the invention light is passed through such volumes of two media which are contiguous to each other. The height of one of the media is indicated by the fact that light which is directed into a prism immersed in the two media is substantially totally reflected by the portion of the prism in one medium and is directed towards the eye of an observer while light entering the portion of the prism in the other medium is refracted to be substantially lost to the eye of an observer. A particularly advantageous modification consists in this that the beam is passed through the prism and indicates the position of the depth without the beam extending within the medium. The practical advantage of this construction will be quite evident by considering the fact that the path of the beam in the interior of the prism is independent of ageing phenomena and, therefore, an exact indication is obtained always.

In the accompanying drawing some modifications of devices according to the invention are shown by way of example.

Fig. 1 is a plan view of a glass prism and diagrammatically illustrates the principles of the invention.

Fig. 2 is a side elevation of a prism in the form of an immersion feeler and shows an embodiment of the invention.

Fig. 3 is a diagrammatic view showing indicating means employed with a prism like that of Fig. 2, the prism being disclosed in section taken on the line III—III of Fig. 2.

Figs. 4 and 5 are sectional views of other modifications of the invention.

Fig. 1 shows a glass prism 1 the base and perpendicular of which are designated with 2 and 3 respectively, whereas the hypotenuse is designated with 4. A light beam from the source of light 6 is, particularly if a lens is used for rectifying the beams, totally reflected at the hypotenuse and therefore will follow the path of the beam indicated in full lines. When leaving the perpendicular 3 of the prism 1 the beams emitted from the source of light 6 impinge upon a photo-electric cell 7 provided at this place. If, however, the light rays coming from the source of light 6 are deflected on their way by the fact that a liquid, having the same refracting index as the transparent solid body, joins the prism, then these rays leave the hypotenuse surface without exciting the light sensitive cell 7. If the source of light 6 extends in the form of strips along the base 2 and the light sensitive cell 7 along the perpendicular 3, the light reflection at the hypotenuse changed by a phase boundary will be observable in the proper height upon the cell. Up to a certain height the cell is not impinged by the rays, but starting from the point at which the rod rises from the liquid the cell is impinged by the rays.

Based upon this fact the invention consists in fixing in the boundary range between the phases to be examined a transparent feeler, for instance in the form of an elongated right angle prism of glass or other transparent material and of a length corresponding to the probable change of position of the level, arranging a light source upon a limited strip, preferably in the middle portion, in the case of the use of a prism upon or within the surface of the base, and, moreover, providing upon or in the surface of the perpendicular a strip-like light sensitive cell the energizing of which in accordance with the phase boundary is indicated and measured.

Instead of a single indicating apparatus several apparatus may be used which by a corresponding arrangement indicate an ascertained level. No special demands need to be put on the light source. In accordance with the invention it is only necessary that the source of light is about of strip-like form and practically has equal light density at all points. The photoelectric cell also should have such a strip-like form, but otherwise may be of any construction. Preferably the sensibility of this electric eye is equally high at all points.

The other figures illustrate some preferred modifications of the invention.

In Fig. 2 a hollow triangular prism is shown which may be introduced and fixed into a fuel tank by a knob provided at one end. The prism consists of transparent material, as natural or artificial glass. For carrying out the invention the prism may differently be formed as shown in Figs. 3 to 5.

Fig. 3 shows a section on the line III—III in Fig. 2. It may be seen that upon the base 2 a strip-like illuminating member 6, for instance a lamp energized by electricity or other suitably elongated light source, is mounted in the sleeve 5. The hollow space between the illuminating member 6 and the sleeve 5 is solidly filled for instance with glass. Upon the perpendicular 3 the light beam leaves the prism. Depending on the height of the liquid level, more or less light impinges upon the electric eye 7. The individual parts of the strip-like cell are correspondingly differently excited which by means of connections known for other purposes is transferred over the conductors 8 upon the indicator 9.

According to the modification shown in Fig. 4 a solid prism is used. The liquid level changes its position in a fore chamber 10. This chamber 10 is formed in the sleeve 5 and extends along the entrance face of the prism. Screens or other members with small apertures may be used at the ends of the chamber 10 to prevent the entrance of sediment or other foreign matter into the chamber when the prism is immersed in a fluid. Operation of the modification shown in Fig. 4 is of a character like that described in connection with the device of Fig. 1.

Fig. 5 also employs a fore chamber in a sleeve 5' similar to the sleeve 5 of Fig. 4. In this instance, however, luminous material 60, which serves as a light source, is contained within the fore chamber. Operation of the modification shown in Fig. 5 is like that of the other illustrated embodiments of the invention.

To ensure as good an indication as possible the immersion feelers according to the invention are always made of such kinds of natural or artificial resins which are absolutely insensitive with regard to the material with which they come into contact and which have a strong difference in the refracting index from that of the gas. If in individual cases the level of a liquid is to be examined and the refracting index of this liquid is not sufficiently different from that of air, preferably another gas is disposed on top of the liquid. In all cases an immersion feeler results which inertialessly indicates a phase boundary without using elements to be moved.

What I claim is:

1. An apparatus for measuring the liquid level in tanks comprising an elongated right-angle prism adapted to be disposed within the tank and extend from the bottom of the tank to a point that is substantially at the top thereof, a source of light adjacent one face of said prism and extending throughout the length thereof, a strip-like photo-electric cell adjacent another face of said prism and extending the entire length thereof adapted to receive light rays from the light source which are reflected from the hypotenuse face of the prism, said light source, prism and photo-electric cell being so arranged that the liquid in the tank will receive light rays in proportion to the depth of liquid in the tank, and a meter connected to the photo-electric cell whereby to indicate the liquid level in the tank.

2. An apparatus for measuring the liquid level in tanks comprising a hollow, elongated right-angle prism adapted to be disposed within the tank and extend from the bottom of the tank to a point that is substantially at the top thereof, a source of light adjacent one face of said prism and extending throughout the length thereof, a strip-like photo-electric cell adjacent another face of said prism and extending the entire length thereof adapted to receive reflected light rays from the light source which are reflected from the hypotenuse face of the prism, said light source, prism and photo-electric cell being so arranged that the liquid in the tank will receive light rays in proportion to the depth of liquid in the tank, and a meter connected to the photo-electric cell whereby to indicate the liquid level in the tank.

3. An apparatus for measuring the liquid level in tanks comprising an elongated right-angle prism adapted to be disposed within the tank and extend from the bottom of the tank to a point that is substantially at the top thereof, a source of light adjacent but spaced from one face of said prism and extending throughout the length thereof, transparent means for securing the light source to one face of the prism, said means defining an elongated chamber between the light source and the prism in which liquid will rise to the level of that in the tank, a strip-like photo-electric cell adjacent another face of said prism and extending the entire length thereof adapted to receive light rays from the light source which are reflected from the hypotenuse face of the prism, and a meter connected to the photo-electric cell whereby to indicate the liquid level in the tank.

4. An apparatus for measuring the liquid level in tanks comprising an elongated right-angle prism adapted to be disposed within the tank and extend from the bottom of the tank to a point that is substantially at the top thereof, a source of light of luminous substance adjacent one face of said prism and extending throughout the length thereof, transparent means for securing the light source to one face of the prism, said means defining an elongated chamber between the light source and the prism in which liquid will rise to the level of that in the tank, a strip-like photo-electric cell adjacent another face of said prism and extending the entire length thereof adapted to receive light rays from the light source which are reflected from the hypotenuse face of the prism, and a meter connected to the photo-electric cell whereby to indicate the liquid level in the tank.

WILHELM BARSTIES.